US008277310B2

(12) United States Patent
Koyama

(10) Patent No.: US 8,277,310 B2
(45) Date of Patent: Oct. 2, 2012

(54) MEDIUM POSITION DETERMINATION APPARATUS

(75) Inventor: Toshimi Koyama, Koto-ku (JP)

(73) Assignee: Universal Entertainment Corporation, Tokyo (JP)

(*) Notice: Subject to any disclaimer, the term of this patent is extended or adjusted under 35 U.S.C. 154(b) by 576 days.

(21) Appl. No.: 12/470,018

(22) Filed: May 21, 2009

(65) Prior Publication Data

US 2009/0291751 A1 Nov. 26, 2009

(30) Foreign Application Priority Data

May 22, 2008 (JP) ................................ 2008-134123

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................... 463/25; 463/43

(58) Field of Classification Search .................... 463/25, 463/43
See application file for complete search history.

(56) References Cited

U.S. PATENT DOCUMENTS 4,814,589 A * 3/1989 Storch et al. .................. 235/375
5,781,647 A * 7/1998 Fishbine et al. .............. 382/100
7,719,424 B2* 5/2010 Steil ........................... 340/572.4
2005/0026680 A1* 2/2005 Gururajan ....................... 463/25
2007/0035399 A1* 2/2007 Hecht et al. ................ 340/572.1
2007/0057469 A1* 3/2007 Grauzer et al. ............... 273/309
2007/0184898 A1* 8/2007 Miller et al. ..................... 463/29
2010/0120487 A1* 5/2010 Walker et al. ................... 463/17

FOREIGN PATENT DOCUMENTS

JP 7-167618 7/1995
JP 8-86851 4/1996
JP 2004-28811 1/2004
JP 2004-102953 4/2004
JP 2004-105321 4/2004
JP 2004-195156 7/2004

OTHER PUBLICATIONS

Tsubasa Koike, "Object recognition in 3D space by stereo matching and SVM", Department of Science Computer Science, Information Course Honda Laboratory (with English translation).

* cited by examiner

*Primary Examiner* — Fernando L Toledo
*Assistant Examiner* — Karen Kusumakar
(74) *Attorney, Agent, or Firm* — Lexyoume IP Meister, PLLC.

(57) ABSTRACT

When the same gaming chip is identified in betting regions, a betting apparatus identifies an intermediate position of the betting regions as a tentative position of the gaming chip. The betting apparatus determines whether or not gaming chips are placed on the same betting region based on a distance between tentative positions of the gaming chips. When a gaming chip is identified in one betting region, the betting apparatus determines that the gaming chip is placed on a center position of the betting region. When gaming chips are not placed on the same betting region, the betting apparatus determines that the gaming chips are placed on tentative positions of the gaming chips. When gaming chips are placed on the same betting region, the betting apparatus determines that the gaming chips are placed on an intermediation position on a line connecting tentative positions of the gaming chips.

2 Claims, 15 Drawing Sheets

| CHIP NUMBER | TENTATIVE CENTRAL COORDINATE | CHIP POSITION | SAME GROUP |
|---|---|---|---|
| 1001 | (a5&a6,b4) | a | a,b |
| 1002 | (a5&a6,b4) | a | |
| 1003 | (a5&a6,b4&b5) | b | |
| 2001 | (a6&a7,b4) | c | c,d |
| 2002 | (a6&a7,b4) | c | |
| 2003 | (a6&a7,b3&b4) | d | |
| 2004 | (a6&a7,b3&b4) | d | |

| | a5 | a6 | a7 |
|---|---|---|---|
| b3 | | 2003<br>2004 | 2004 |
| b4 | 1001<br>1002<br>1003 | 1001<br>1002<br>1003<br>2001<br>2002<br>2003<br>2004 | 2001<br>2002<br>2003<br>2004 |
| b5 | 1003 | 1003 | |

| CHIP NUMBER | TENTATIVE CENTRAL COORDINATE | CHIP POSITION | SAME GROUP |
|---|---|---|---|
| 1001 | (a5&a6,b4) | a | a,b |
| 1002 | (a5&a6,b4) | a | |
| 1003 | (a5&a6,b4&b5) | b | |
| 2001 | (a6&a7,b4) | c | c,d |
| 2002 | (a6&a7,b4) | c | |
| 2003 | (a6&a7,b3&b4) | d | |
| 2004 | (a6&a7,b3&b4) | d | |

MEDIUM POSITION DETERMINATION APPARATUS

CROSS REFERENCE TO RELATED APPLICATION

This application claims benefit of priority under 35 U.S.C. §119 to Japanese Patent Application No. 2008-134123, filed on May 22, 2008, the entire contents of which are incorporated by reference herein.

BACKGROUND OF THE INVENTION

1. Field of the Invention

The present invention relates to a medium position determination apparatus configured to determine a position where a medium to be used in a game is placed.

2. Description of the Related Art

Patent documents 1 (Japanese Published Unexamined Application No. 2004-195156), 2 (Japanese Published Unexamined Application No. 2004-105321) and 3 (Japanese Published Unexamined Application No. 2004-102953) disclose a technique in which, when an X-array antenna and a Y-array antenna emit radio waves, a magnetic field is generated in an upward direction vertical to a table at a cross point where the X-array antenna crosses the Y-array antenna, so as to read information stored in a wireless IC tag embedded in a gaming chip placed on the cross point. The technique carries out the reading operation by each batting region on the table in series.

In a game such as roulette or blackjack to be played in a casino, a player places one or more gaming chips on one or more betting regions of a betting board of the table to bet the one or more gaming chips and plays the game. Each gaming chip includes a wireless IC tag therein. Information stored in the gaming chip is read by generating a magnetic field from an antenna mounted in the betting board. The reading operation is carried out in series, with respect to all betting regions of the betting board. The reading operation determines where each gaming chip is placed on the betting board.

Magnetic lines of magnetic field generated from an antenna are formed in concentric loops. So, in a case where a plurality of gaming chips is stacked in layers on a betting region, if the magnitude of magnetic field is too small, there is a possibility that information stored in a wireless IC tag embedded in an upper gaming chip is not read because the magnetic lines of magnetic field does not reach the upper gaming chip. On the other hand, if the magnitude of magnetic field is too large, there is a possibility that information stored in a wireless IC tag embedded in a gaming chip placed another betting region adjacent to the betting region on which the stacked gaming chips are placed because the magnetic lines of magnetic field reach the another betting region. Thus, depending on the magnitude of magnetic field, there is a possibility that the reading operation can not surely determine where each gaming chips is placed on the betting board.

SUMMARY OF THE INVENTION

It is an object of the present invention to provide a medium position determination apparatus capable of surely determining where a medium such as a gaming chip is placed on a gaming table without being affected by the magnitude of magnetic field.

In order to achieve the object, a medium position determination apparatus comprising: a gaming table on which a gaming medium is placed; a reading unit that electromagnetically reads information stored in a gaming medium placed on each region formed on the gaming table; an identification information identifying unit that identifies identification information of a gaming medium placed on each region formed on the gaming table based on information of the gaming medium read by the reading unit; a tentative position identifying unit that, when the same gaming medium is identified by the identification information identifying unit in two or more regions formed on the gaming table, identifies an intermediate position of the two or more regions as a tentative position of the gaming medium; a same region determining unit that determines whether or not gaming media are placed on the same region based on a distance between tentative positions of the gaming media; and a medium position determining unit that, determines that, when a gaming medium is identified by the identification information identifying unit in one region formed on the gaming table, the gaming medium is placed on a center position of the one region, determines that, when the same region determining unit determines that gaming media are not placed on the same region, the gaming media are placed on tentative positions of the gaming media, and determines that, when the same region determining unit determines that gaming media are placed on the same region, the gaming media are placed on an intermediation position on a line connecting tentative positions of the gaming media.

According to the present invention, if a gaming medium is read in a plurality of regions, the betting apparatus identifies an intermediate position of the plurality of regions as a tentative central coordinate of the gaming medium. Then, the betting apparatus determines whether or not a gaming medium is placed on the same position as another gaming medium based on the distance between tentative central coordinates of the gaming medium and the another gaming medium. If the distance is smaller than the size of gaming medium, the betting apparatus determines that the gaming medium is placed on the same position as the another gaming medium. If the distance is larger than the size of gaming medium, the betting apparatus determines that the gaming medium is placed on the different position from the another gaming medium. Therefore, the betting apparatus can surely determine where a gaming medium is placed on the gaming table without being affected by the magnitude of magnetic field.

In a preferred embodiment of the present invention, the medium position determination apparatus further comprising: an imaging unit that takes an image of a gaming medium placed on the gaming table; and an imaged medium calculating unit that calculates a distance from a first end to a second end of a gaming medium taken by the imaging unit as an image, and calculates a central coordinate of the gaming medium based on the calculated distance, wherein the medium position determining unit determines that a gaming medium of which a placed position is not determined is placed on a central coordinate of the gaming medium calculated by the imaged medium calculating unit.

According to the embodiment, the betting apparatus can adequately determine where all gaming media are placed on the gaming table.

DESCRIPTION OF THE EMBODIMENTS

With reference to FIGS. 1 to 20, an exemplary embodiment of the present invention will be described below. In the exemplary embodiment, a betting apparatus for game is cited as a medium position determination apparatus of the present invention.

Figure 1:
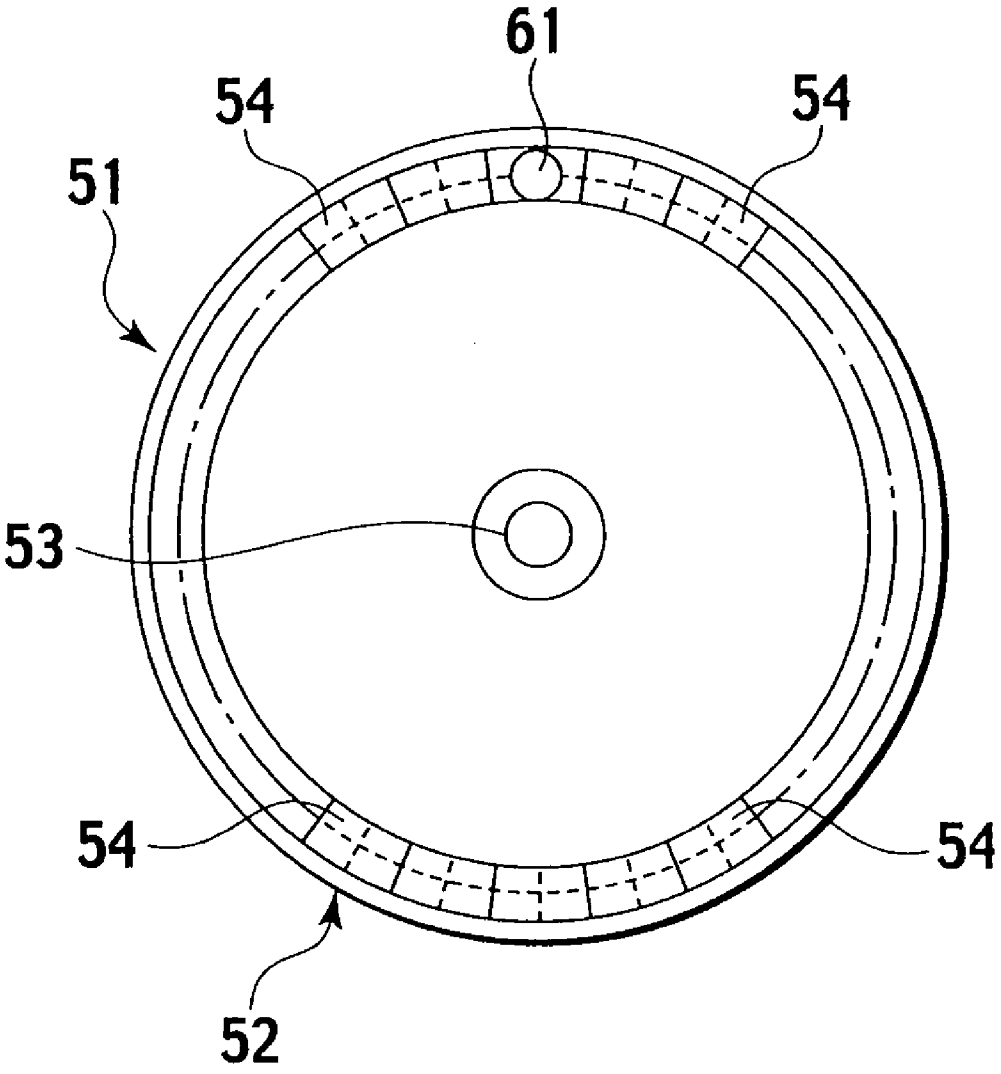
FIG. 1 is a plane view of a roulette board according to an exemplary embodiment of the present invention.
Figure 9:
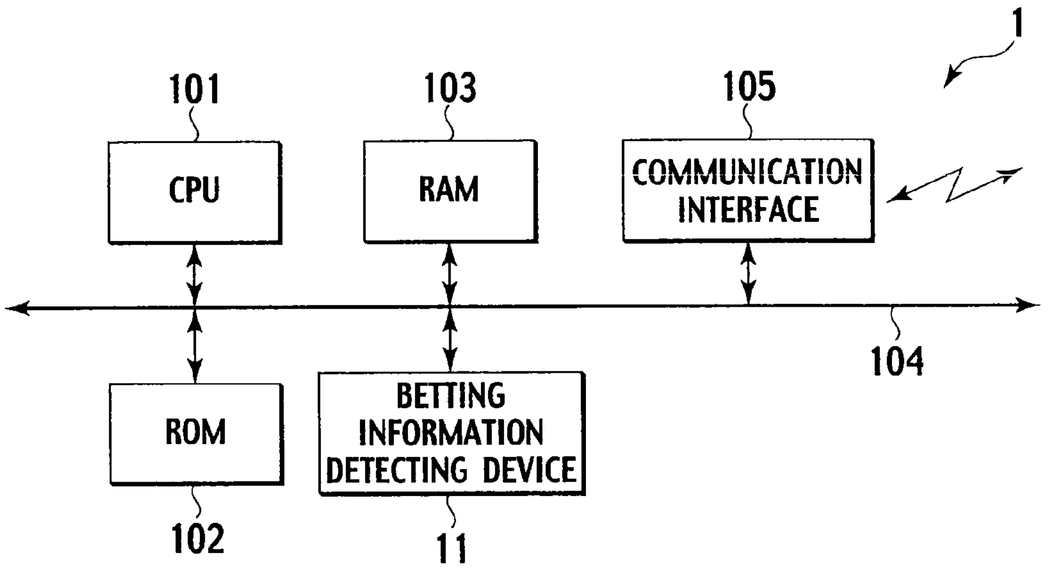
FIG. 9 is a block diagram of electrical connections in the betting apparatus for game according to the exemplary embodiment of the present invention.

A roulette board 51 shown in FIG. 1 and a betting apparatus for game 1 shown in FIG. 9 are installed in a casino within a casino hotel. A player predicts one or more pocket numbers assigned to one or more pockets 54 each in which he/she expects a roulette ball 61 thrown in the roulette board 51 to be received. Then, the player bets one or more gaming chips 71 on one or more betting regions 3 corresponding to the predicted one or more pocket numbers using the betting apparatus 1, and then plays the roulette.

Figure 3:
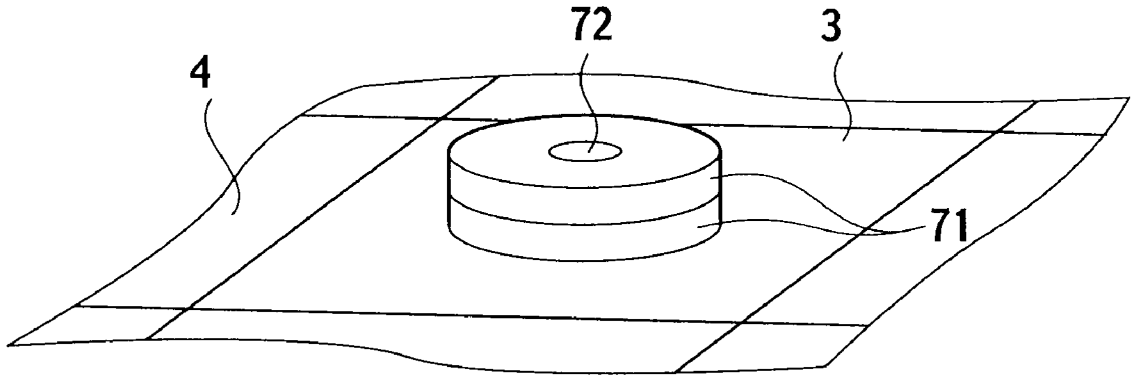
FIG. 3 is a partly enlarged perspective view of gaming chips stacked in layers on the betting board shown in FIG. 2.

The betting apparatus 1 is provided with a betting board 4 on which one or more gaming chips 71 will be bet. An upper surface of the betting board 4 is divided into betting regions 3 (e.g., spots where numbers “0”, “00”, “1”, “2”, . . . , “35”, “36” are assigned) corresponding to pocket numbers assigned to pockets 54 of the roulette board 51. A frame 5 divides the upper surface of the betting board 4 into the betting regions 3. As shown in FIG. 3, a wireless IC tag 72 is embedded in a gaming chip 71 concerned and stores information regarding the gaming chip 71 therein. The roulette board 51 is provided with a pocket number detecting device 52 that detects a pocket number assigned to a pocket 54 in which the roulette ball 61 is received and a type of the pocket number (see FIG. 1). The betting board 4 is provided with a betting information detecting device 11 that detects a betting position and value of a gaming chip 71 by communicating with a wireless IC tag 72 embedded in the gaming chip 71 to read information regarding the gaming chip 71 stored in the wireless IC tag 72 when the gaming chip 71 is placed on a betting region 3 (see FIG. 4). Further, a dividend calculation system (not shown) is installed in the casino. The dividend calculation system calculates the dividend in a current game (roulette) on the basis of a pocket number assigned to a pocket 54 in which the roulette ball 61 is received, and a betting position and value of a gaming chip 71 placed on a betting region 3 corresponding the pocket number.

Information regarding a gaming chip 71 stored in a wireless IC tag 72 includes a unique number (identification number) for identifying the gaming chip 71, value (e.g., one-dollar, five-dollar or ten-dollar) of the gaming chip 71, color of the gaming chip 71, a place where the gaming chip 71 is allowed to be used (information for identifying a casino where the gaming chip 71 is allowed to be used). It is noted that, under a condition where the information includes only the unique number of the gaming chip 71 and other data are associated with the unique number and stored in a server within a casino as the database, the betting information detecting device 11 may detect other data on the basis of the unique number read from the wireless IC tag 72 while referring to the database stored in the server.

The pocket number detecting device 52 is an ID reading device (not shown). The ID reading device includes plural sets of X-side transmitting antennas and X-side receiving antennas that extend from an X-side scan driver in parallel with each other, and plural sets of Y-side transmitting antennas and Y-side receiving antennas that extend from a Y-side scan driver in parallel with each other. When scan radio waves are emitted from an X-side transmitting antenna and a Y-side transmitting antenna, a radio wave for reading is generated in an upward direction vertical to the roulette board 51 at the cross point where the X-side transmitting antenna cross the Y-side transmitting antenna. The radio wave for reading is received by a corresponding X-side receiving antenna and a corresponding Y-side receiving antenna. If the roulette ball 61 exists in the vicinity of the cross point, a receiving state is changed by impedance change according to dielectric effect of the roulette ball 61. The ID reading device determines whether or not there is the roulette ball 61 by detecting the change state.

More specifically, the roulette board 51 is formed in a circular rotating body shape. Thirty-eight pockets 54 are concentrically formed around a center axis 53. It is noted that FIG. 1 illustrates a part of the thirty-eight pockets 54. Each pocket 54 shows a number (e.g., 0, 00, 1, 2 . . . 35 or 36) assigned to each betting region 3 of the betting board 4. Cross points of the ID reading device are arranged to the thirty-eight pockets 54, respectively. When the roulette ball 54 is received in one pocket 54, the roulette ball 61 is located on any one of the cross points. If the roulette ball 61 is located on one cross point, a receiving state of only the one pocket 54 is changed because radio waves for reading are always generated in the upward direction at all the cross points in a game. This allows the ID reading device to determine the one pocket 54 where the roulette ball 61 is received. The ID reading device transmits data regarding the one pocket 54 to a player tracking system (PTS) server (not shown) within the casino hotel. The PTS server centrally manages the history of roulette.

The roulette ball 61 includes a wireless IC tag (not shown) in which roulette ball identification information for identifying the roulette ball 61 is stored. The wireless IC tag is embedded in the roulette ball 61. The roulette ball identification information includes a place of origin where the roulette ball 61 is stored (information for identifying a storage where the roulette ball 61 is allowed to be stored), a place where the roulette ball 61 is allowed to be used (information for identifying a casino where the roulette ball 61 is allowed to be used) and a type of the roulette ball 61. The ID reading device reads the roulette ball identification information stored in the wireless IC tag embedded in the roulette ball 61. This allows the ID reading device to determine whether or not a roulette ball can be used in this casino, which prevents fraudulent activity or infringement for using a counterfeit roulette ball in this casino from occurring.

In such a gaming system, a player who desires to play a game on the roulette board 51 carries an identification card and enters the casino. The identification card is issued from a card issuing device at a hotel front of the casino hotel, with respect to a guest who checks in at the hotel front. The identification card is a card for identifying the guest. After the identification card is issued, when the guest produces his/her identification card and goes through a check at each facility of the casino hotel, he/she can use the facility. For example, at a cash desk of restaurant or bar in the casino hotel, when the identification card is read by a card reader, the amount of payment is associated with identification information of the guest and stored in a hotel server of the casino hotel. Then, at the time when he/she checks out at the hotel front, the total amount of payment is displayed on a terminal of the hotel front. Namely, the identification card has a function as credit card to be used when the guest makes payment in each facility of the casino hotel.

When the guest carries the identification card and enters the casino, he/she gets a desired number of gaming chips 71 from a gaming chip exchanging device and sets his/her identification card in a reading device (not shown) for reading identification card. At this time, the reading device reads information stored in the identification card to identify the guest and recognize him/her as a player who will participate in a game. The reading device transmits recognized data to the PTS server. The PTS server registers the recognized data as a player who will participate in a game. It is noted that a reading type of the identification card (e.g., magnetic reading type or optical reading type) may be arbitrarily set according to a recording type of the identification card (e.g., magnetic recording or optical recording).

Figure 2:
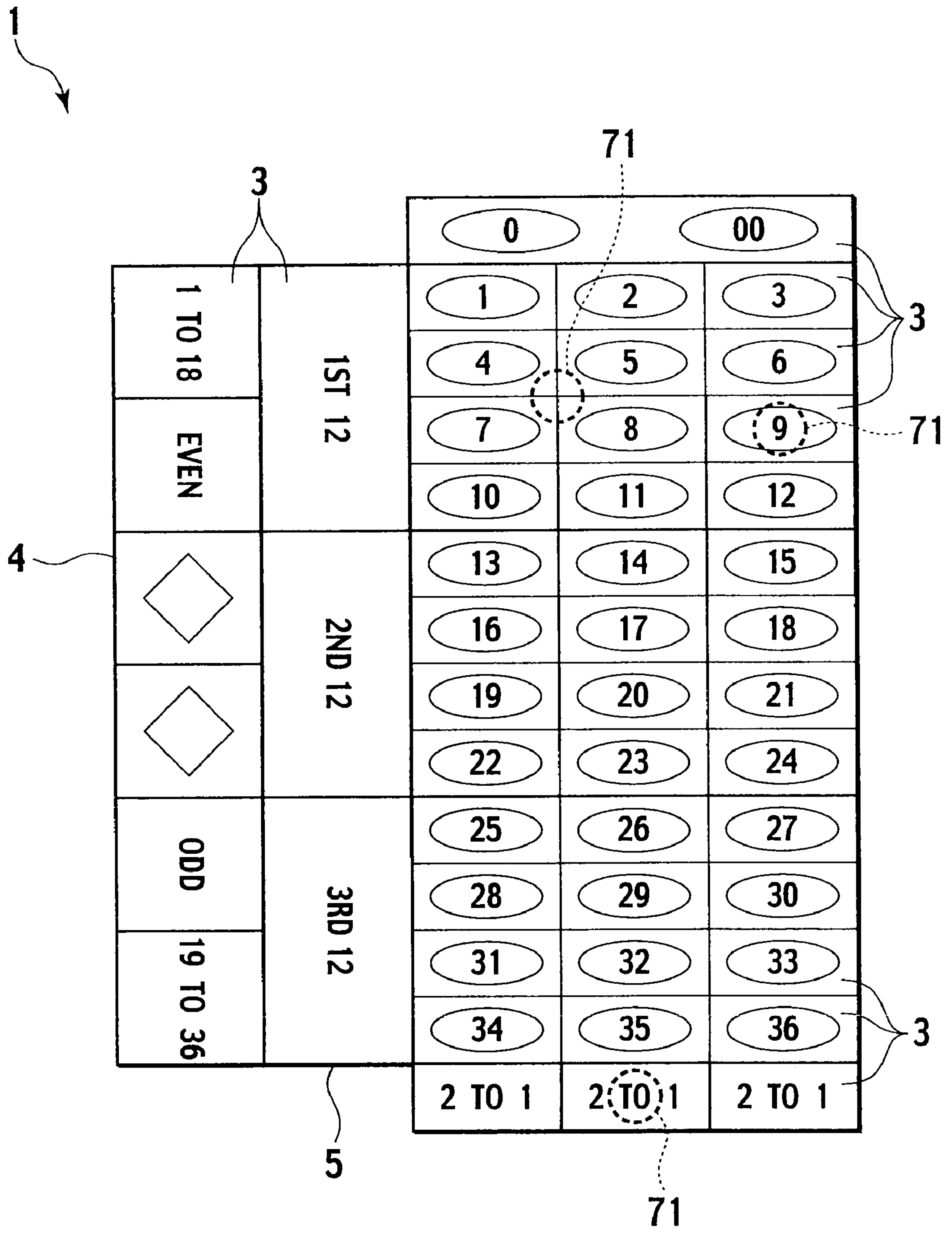
FIG. 2 is a plane view of a betting board of a betting apparatus for game according to an exemplary embodiment of the present invention.

In roulette, firstly, each player places one or more own gaming chips 71 on one or more desired betting regions 3 of the betting board 4 to bet the one or more gaming chips 71. For example, as shown in FIG. 2, a player places a gaming chip 71 on a corner of the numbers “4”, “5”, “7” and “8” to carry out a corner bet for the numbers “4”, “5”, “7” and “8”, a player places a gaming chip 71 on the number “9” to carry out a straight bet for the number “9”, and a player places a gaming chip 71 on the column “2 to 1” to carry out a column bet for the column “2 to 1”. At this time, the betting information detecting device 11 detects one or more betting regions 3 on which each player bets one or more gaming chips 71 and the total value (e.g., three one-dollar, two five-dollar and one ten-dollar) of gaming chips 71 which each player bets on each betting region 3, and transmits the detection result to the PTS server. The PTS server centrally manages the history of detection result.

After all players have bet one or more gaming chips 71, a croupier rotates the roulette board 51 and throws in the roulette ball 61 in the roulette board 51. Then, when the roulette board 51 gently rotates, the roulette ball 61 is received in any one of the thirty-eight pockets 54. For example, if the number of pocket 54 in which the roulette ball 61 is received is “8”, the pocket number detecting device 52 detects that the number of pocket 54 in which the roulette ball 61 is received is “8” and transmits the detection result to the PTS server. The PTS server centrally manages the history of detection result. It is noted that the PTS server may centrally manage the history and various data regarding another roulette board other than the roulette board 51 and another gaming machine such as a slot machine.

An aggregate analysis server (not shown) in the casino hotel is provided with the dividend calculation system. The dividend calculation system calculates the dividend in a current game (roulette), on the basis of the number of pocket 54 in which the roulette ball 61 is received, one or more betting regions 3 on which each player bets one or more gaming chips 71, and the total value of gaming chips 71 which each player bets on each betting region 3.

Next, the betting information detecting device 11 will be described with reference to FIG. 4.

Figure 4:
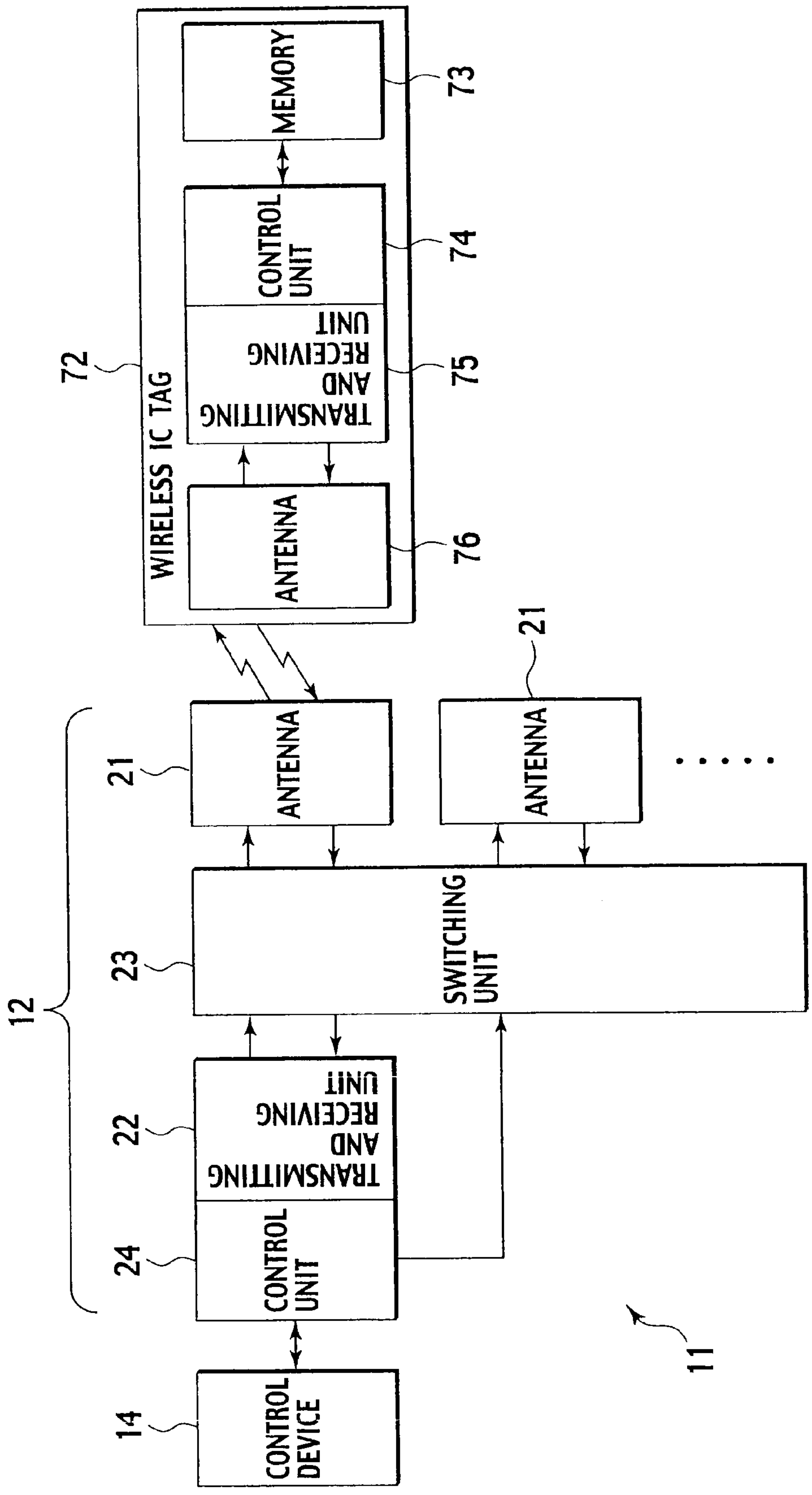
FIG. 4 is a block diagram of electrical connections of a wireless IC tag and a reading device and a control device included in a betting information detecting device according to the exemplary embodiment of the present invention.

As shown in FIG. 4, the betting information detecting device 11 includes a reading device 12 and a control device 14. The control device 14 instructs the reading device 12 to generate a magnetic field to supply electric power to the wireless IC tag 72 or to transmit information received from the wireless IC tag 72 and stored in the wireless IC tag 72.

The reading device 12 includes antennas (loop antennas) 21, a transmitting and receiving unit 22, a switching unit 23 and a control unit 24. The control unit 24 receives an instruction from the control device 14 and drives the transmitting and receiving unit 22 and the switching unit 23 according to the instruction. The transmitting and receiving unit 22 generates a magnetic field for supplying electric power to the wireless IC tag 72 through each antenna 21. More specifically, the transmitting and receiving unit 22 switches the antennas 21 using the switching unit 23 in series, to generate a magnetic field from each antenna 21. At this time, the transmitting and receiving unit 22 receives a radio wave signal using each antenna 21 and the switching unit 23 and demodulates the radio wave signal with load modulation to read information stored in the wireless IC tag 72.

The wireless IC tag 72 is a magnetic field type wireless IC tag and includes a memory 73, a control unit 74, a transmitting and receiving unit 75 and an antenna 76. The memory 73 is a memory device that stores a unique number (identification number) for identifying the gaming chip 71. It is noted that the memory 73 may store value (e.g., one-dollar, five-dollar or ten-dollar) of the gaming chip 71, color of the gaming chip 71, a place where the gaming chip 71 is allowed to be used (information for identifying a casino where the gaming chip 71 is allowed to be used). The control unit 74 interprets a command, a request or an instruction received from the reading device 12 and executes action corresponding to the command, the request or the instruction. The transmitting and receiving unit 75 includes a modulating unit (not shown) and a demodulating unit (not shown), and modulates or demodulates a signal for communicating with the reading device 12. The antenna 76 supplies electric power to the transmitting and receiving unit 75 by a magnetic field from the reading device 12, and receives a modulated wave from the transmitting and receiving unit 75 and emits the modulated wave into air so that the reading device 12 receives it.

Although the betting information detecting device 11 supplies electric power to the wireless IC tag 72 and reads information stored in the wireless IC tag 72, using a common antenna 21, the betting information detecting device 11 may supply electric power to the wireless IC tag 72 using one antenna and read information stored in the wireless IC tag 72 using another antenna.

Figure 5:
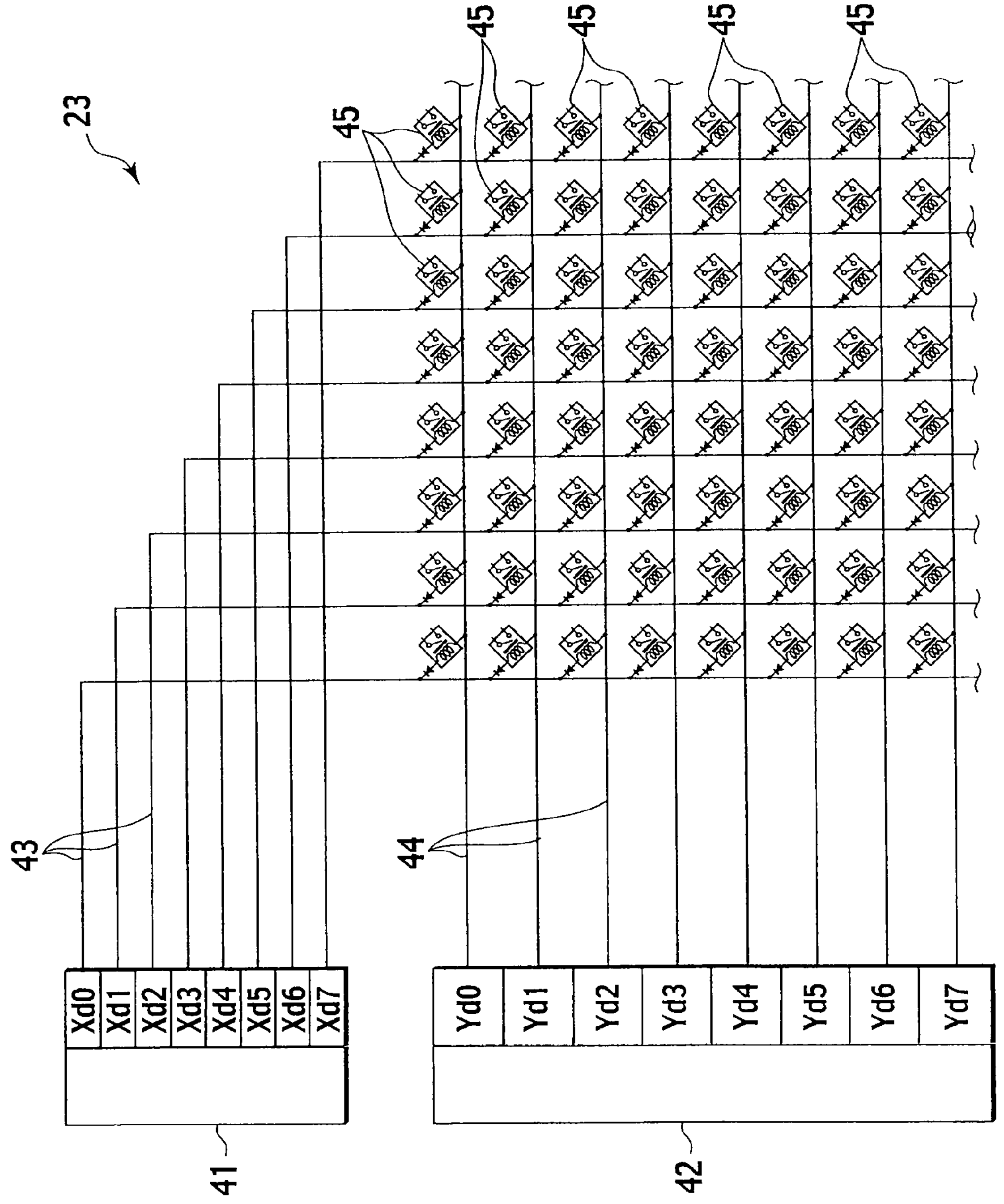
FIG. 5 is a circuit diagram illustrating a configuration of a switching unit of the reading device shown in FIG. 4.
Figure 6:
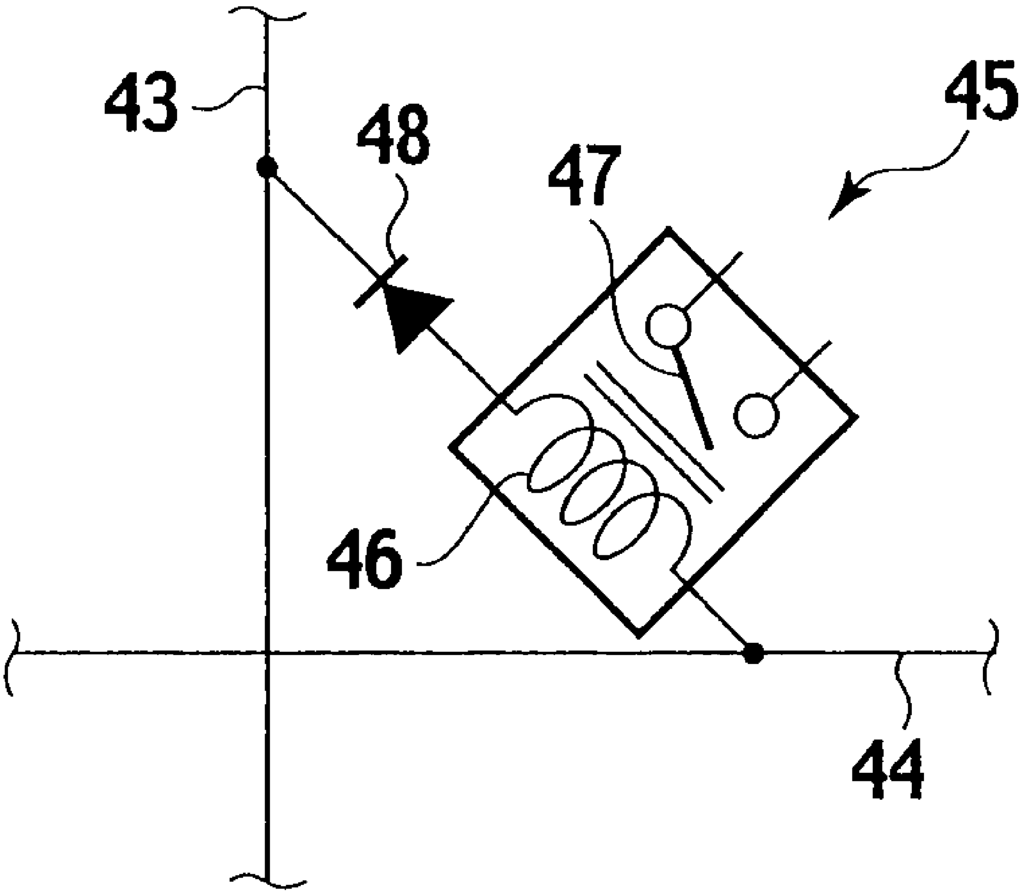
FIG. 6 is a circuit diagram illustrating the configuration of the switching unit of the reading device shown in FIG. 4.

Next, the switching unit 23 will be described with reference to FIGS. 5 to 7.

The switching unit 23 includes an X-side scan driver 41 and a Y-side scan driver 42. Plural X-side transmitting lines 43 extend from the X-side scan driver 41 along a longitudinal direction (or lateral direction) in parallel with one another. Plural Y-side transmitting lines 44 extend from the Y-side scan driver 42 along a lateral direction (or longitudinal direction) in parallel with one another. At each cross point where one X-side transmitting line 43 crosses one Y-side transmitting line 44, a relay circuit 45 is connected. It is noted that FIGS. 6 and 7 illustrate only one relay circuit 45. As shown in FIG. 6, each relay circuit 45 is connected to the X-side transmitting line 43 at one side of a coil 46 and the Y-side transmitting line 44 at the other side of the coil 46. A diode 48 is connected to the coil 46 and the X-side transmitting line 43 so that a cathode side and an anode side correspond to the X-side transmitting line side and the coil side respectively. In order to tune off the relay circuit 45, the X-side transmitting line 43 and the Y-side transmitting line 44 are held at H and L levels respectively. Ordinarily, the X-side transmitting line 43 and the Y-side transmitting line 44 keep this condition. On the other hand, in order to tune on the relay circuit 45, the X-side transmitting line 43 and the Y-side transmitting line 44 are switched to L and H levels respectively. This allows current to flow the coil 46 to close a switch 47.

Figure 7:
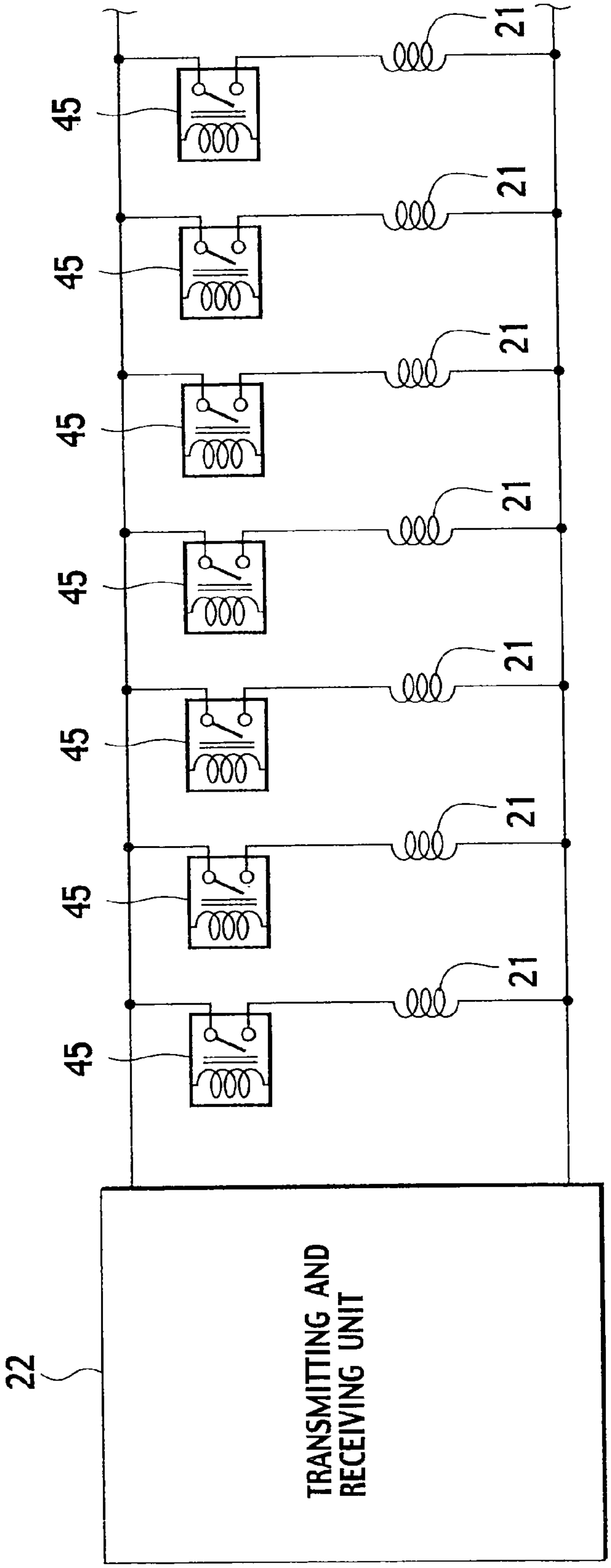
FIG. 7 is a circuit diagram illustrating the configuration of the switching unit and antennas of the reading device shown in FIG. 4.

As shown in FIG. 7, one antenna 21 is connected to the relay circuit 45 in series. In this connection, when the relay circuit 45 is turned off, the antenna 21 is not driven. When the relay circuit 45 is turned on, the antenna 21 is driven. The relay circuit 45 is a high frequency wave relay.

Next, the arrangement of the antennas 21 will be described with reference to FIG. 8.

Figure 8:
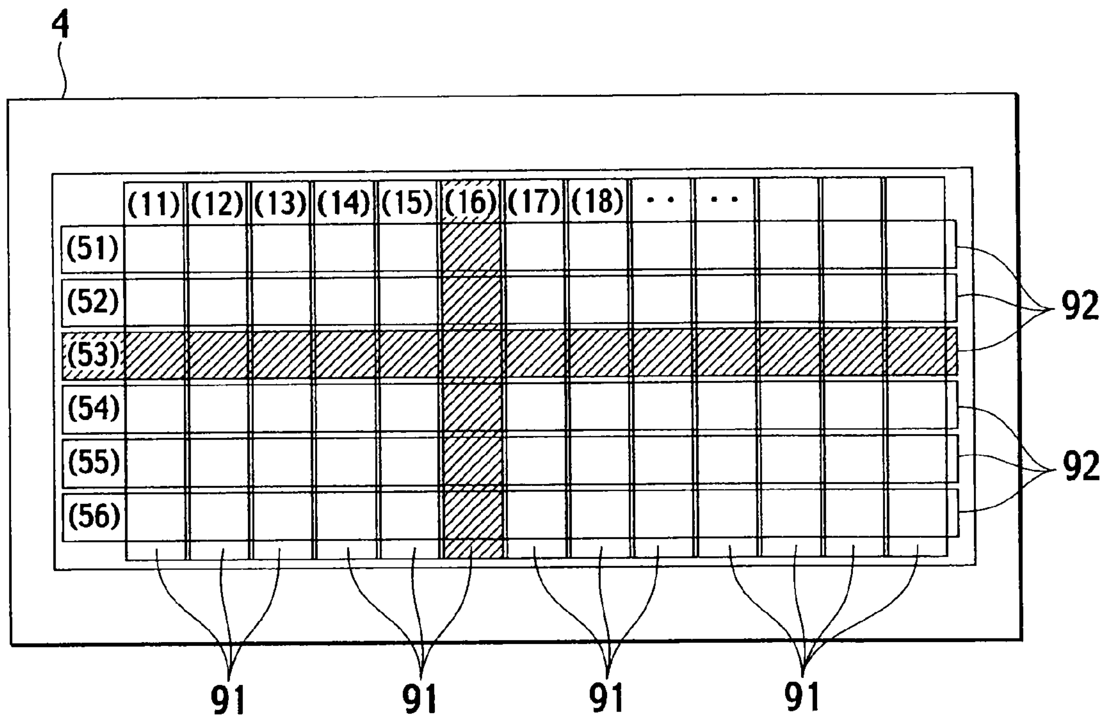
FIG. 8 is an explanatory diagram illustrating one example of an arrangement of antennas in the betting board shown in FIG. 2.

FIG. 8 illustrates one example of the arrangement of antennas 21 in the betting board 4. As shown in FIG. 8, the numbers "11", "12", "13", "14", "15", "16", "17", "18" . . . of columns 91 and the numbers "51", "52", "53", "54", "55", "56" of rows 92 are assigned to the betting regions 3. Thus, each betting region 3 has the block number composed of the numbers of one column 91 and one row 92. One or more antennas 21 are arranged to each column 91 or each row 92. The reading device 12 drives one or more antennas 21 arranged one column 91 to read one or more pieces of information stored in one or more wireless IC tags 72 of one or more gaming chips 71 placed on the one column 91. Also, the reading device 12 drives one or more antennas 21 arranged one row 92 to read one or more pieces of information stored in one or more wireless IC tags 72 of one or more gaming chips 71 placed on the one row 92.

For example, the reading device 12 firstly drives one or more antennas 21 arranged to each column 91 in series, in order of increasing the number of the column 91 from the number "11". Next, the reading device 12 drives one or more antennas 21 arranged to each row 92 in series, in order of increasing the number of the row 92 from the number "51". We assume that gaming chips 71 are placed on betting regions 3 having the column number "11". In this case, the reading device 12 firstly determines whether or not one or more gaming chips 71 are placed on betting regions 3 having one column number, in order of increasing the number of the column 91 from the number "11". If one or more gaming chips 72 are placed on betting regions 3 having one column number, the reading device 12 reads one or more pieces of information stored in one or more wireless IC tags 72 of the one or more gaming chips 71. Next, the reading device 12 determines whether or not one or more gaming chips 72 are placed on betting regions 3 having one row number, in order of increasing the number of the row 92 from the number "51". If one or more gaming chips 72 are placed on betting regions 3 having one row number, the reading device 12 reads one or more pieces of information stored in one or more wireless IC tags 72 of the one or more gaming chips 71. Therefore, the reading device 12 can read one or more pieces of information stored in one or more wireless IC tag 72 of one or more gaming chips placed on each betting region 3 having the column number "11" by carrying out AND operation between the reading result of the column number "11" and that of each row number.

FIG. 9 illustrates a block diagram of electrical connections in the betting apparatus 1. The betting apparatus 1 includes the betting information detecting device 11, a CPU 101, a ROM 102, a RAM 103, a bus 104 and a communication interface 105. The CPU 101 carries out various calculations and centrally controls each element of the betting apparatus 1. The RAM 102 stores various fixed data and a control program therein. The RAM 103 is a work area of the CPU 101. The communication interface 105 communicates with another server devices or the like in the casino hotel. The betting information detecting device 11, the CPU 101, the ROM 102 and the RAM 103 and the communication interface 105 are connected to one another via the bus 104.

Next, characteristic processing that the CPU 101 carries out according to the control program stored in the ROM 102 will be described below.

Figure 10:
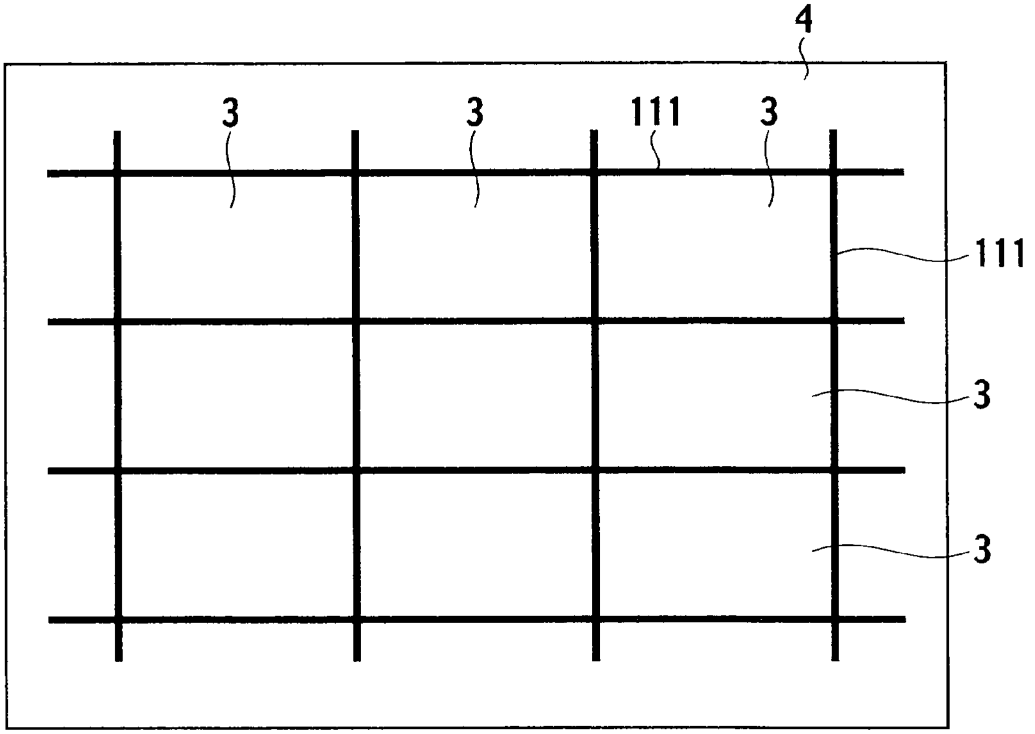
FIG. 10 is an explanatory diagram illustrating processing carried out by the betting apparatus for game according to the exemplary embodiment of the present invention.

FIG. 10 is a partly enlarged plane view of the upper surface of the betting board 4. The upper surface of the betting board 4 is divided into the betting regions 3 by lines 111 (a part of the frame 5). A player places one or more gaming chips 71 on the upper surface of the betting board 4 to bet the one or more gaming chips 71. At this time, a position where one or more gaming chips 71 are to be placed is a position at the intersection of two lines 111, a position on one line 111, or a position in a betting region 3 surrounded by four lines 111. Respective places have different meanings.

Figure 11:
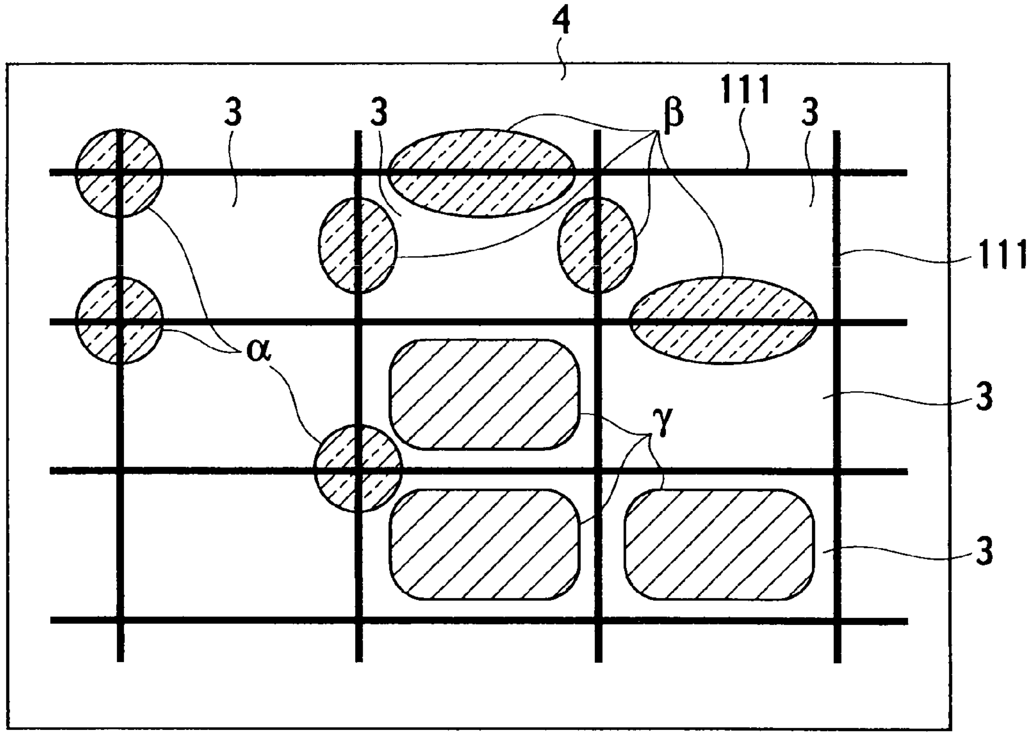
FIG. 11 is an explanatory diagram illustrating the processing carried out by the betting apparatus for game according to the exemplary embodiment of the present invention.

As shown in FIG. 11, positions α, β and γ respectively indicate a position at the intersection of two lines 111, a position on one line 111 and a position in a betting region 3 surrounded by four lines 111. Placing one or more gaming chips 71 on a position α means that the one or more gaming chips are placed on four betting regions 3 around the position α. Placing one or more gaming chips 71 on a position β means that the one or more gaming chips 71 are placed two betting regions 3 on both sides of the position β. Placing one or more gaming chips 71 on a position γ means that the one or more gaming chips 71 are placed on one betting region 3 of the position γ.

Figure 12:
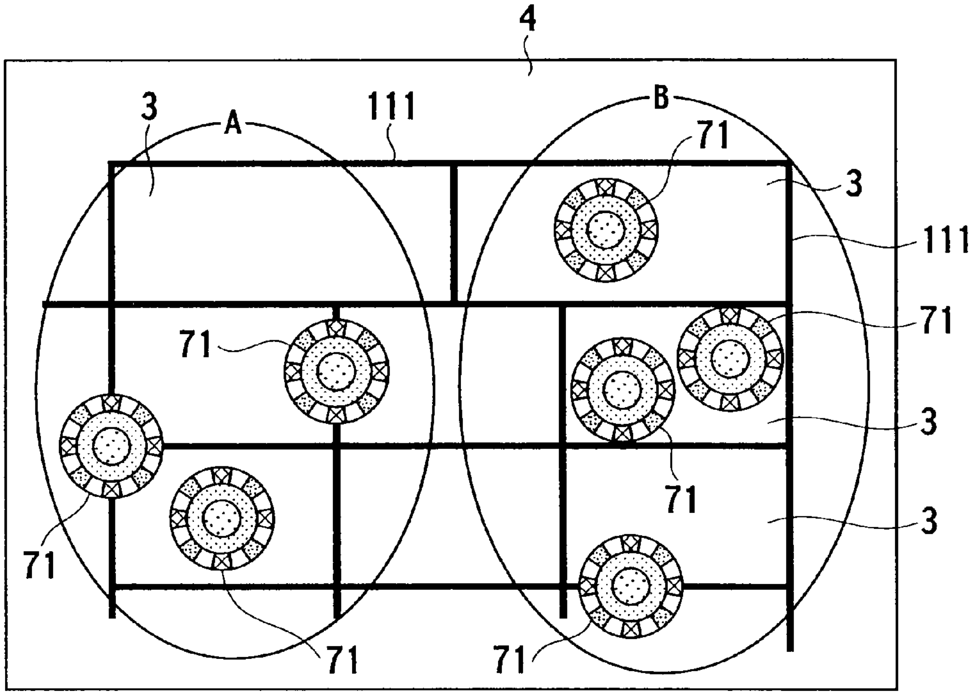
FIG. 12 is an explanatory diagram illustrating the processing carried out by the betting apparatus for game according to the exemplary embodiment of the present invention.

FIG. 12 is a plane view that illustrates a situation where gaming chips 71 are bet on the betting board 4. Two or more gaming chips 71 may be stacked in layers at the same position.

Figure 13:
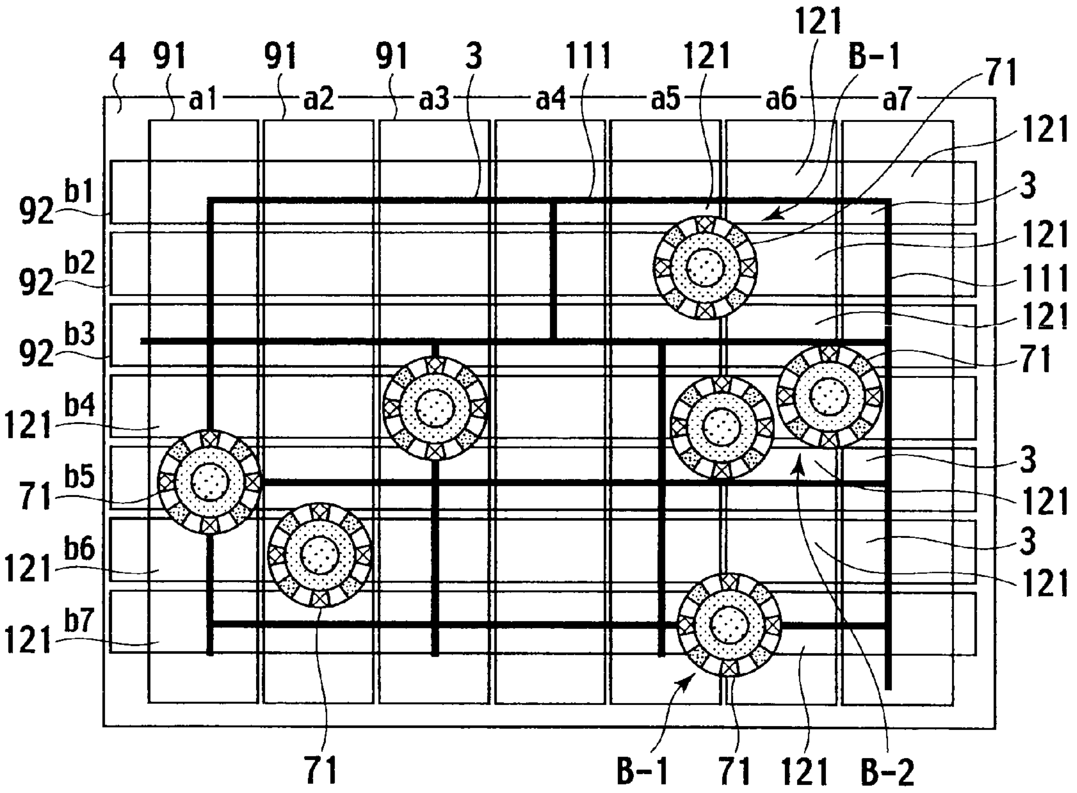
FIG. 13 is an explanatory diagram illustrating the processing carried out by the betting apparatus for game according to the exemplary embodiment of the present invention.

FIG. 13 is a plane view that illustrates placement relationships between columns 91 and betting regions 3 and between rows 92 and betting regions 3. An intersection region 121 is a region where a column 91 intersects with a row 92. In this example, symbols a1 to a7 are assigned to the columns 91 in sequence and symbols b1 to b7 are assigned to the rows 92 in sequence. One or more antennas 21 are arranged to each column 91 (a1 to a7) or each row 92 (b1 to b7). The CPU 101 can determine which intersection region 121 each gaming chip 71 is placed on by carrying out the reading operation of gaming chips 71 using each antenna 21 in series and the AND operation between the reading result of each columns 91 and that of each row 92 in series.

In this example, at least nine intersection regions 121 correspond to one betting region 3. Each intersection region 121 corresponds to a position at the intersection of two lines 111, a position on one line 111 or a position (a center portion of the betting region 3) in a betting region 3 surrounded by four lines 111. Therefore, the CPU 101 determines which position (a position at the intersection of two lines 111, a position on one line 111 or a position in a betting region 3 surrounded by four lines 111) each gaming chip 71 is placed on by detecting an intersection region 121 where an antenna 21 detecting the gaming chip 71 is arranged from among at least nine intersection regions 121.

As shown in FIGS. 12 and 13, in an area A, gaming chips 71 are precisely placed on a position at the intersection of two lines 111, a position on one line 111 and a position in a betting region 3 surrounded by four lines 111 so that the center of each gaming chip 71 is substantially located at the center of each intersection region 121. On the other hand, in an area B, gaming chips 71 are imprecisely placed on a position at the intersection of two lines 111, a position on one line 111 and a position in a betting region 3 surrounded by four lines 111 so that the center of each gaming chip 71 is located away from the center of each intersection region 121.

The CPU 101 checks the correspondence relationship between a position of an antenna 21 reading contents of one or more gaming chips 71 and an intersection region 121, with reference to a certain database (not shown) stored in the aggregate analysis server (not shown) to determine a betting region 3 where the intersection region 121 associated with the antenna 21 is included. This allows the CPU 101 to determine a total value bet on each betting region 3 based on a unique number (identification number) of each gaming chips 71 bet on the associated betting region 3, and a total value paid out based on a game result and each betting region 3 where one or more gaming chips 71 are bet.

Firstly, the reading operation of gaming chip 71 in the area A will be described. In this case, each gaming chip 71 is substantially placed in a single intersection region 121 so that the center of each gaming chip 71 is substantially located at the center of the intersection region 121, and each gaming chip 71 is detected in only the single intersection region 121. According to the example illustrated in FIGS. 12 and 13, one or more gaming chips 71 placed on an intersection region 121 (a1, b5) where the column 91 (a1) intersects with the row 92 (b5) are read by one or more antennas 21 arranged on the column 91 (a1) and one or more antennas 21 arranged on the row 92 (b5). Since the intersection region 121 (a1, b5) is located on a position at the intersection of two lines 111, the CPU 101 determines that the one or more gaming chips 71 are placed on the position at the intersection of two lines 111. The one or more gaming chips 71 are not read by one or more antennas 21 arranged on the column 91 (a2), one or more antennas 21 arranged on the row 92 (b4) and one or more antennas 21 arranged on the row 92 (b6). As well, one or more gaming chips 71 placed on an intersection region 121 (a3, b4) where the column 91 (a3) intersects with the row 92 (b4) are read by one or more antennas 21 arranged on the column 91 (a3) and one or more antennas 21 arranged on the row 92 (b4). Since the intersection region 121 (a3, b4) is located on a position on one line 111, the CPU 101 determines that the one or more gaming chips 71 are placed on the position on one line 111. The one or more gaming chips 71 are not read by one or more antennas 21 arranged on the column 91 (a2), one or more antennas 21 arranged on the column 91 (a4), one or more antennas 21 arranged on the row 92 (b3) and one or more antennas 21 arranged on the row 92 (b5). Further, one or more gaming chips 71 placed on an intersection region 121 (a2, b6) where the column 91 (a2) intersects with the row 92 (b6) are read by one or more antennas 21 arranged on the column 91 (a2) and one or more antennas 21 arranged on the row 92 (b6). Since the intersection region 121 (a2, b6) is located on a position in a betting region 3 surrounded by four lines 111, the CPU 101 determines that the one or more gaming chips 71 are placed on the position in the betting region 3 surrounded by four lines 111. The one or more gaming chips 71 are not read by one or more antennas 21 arranged on the column 91 (a1), one or more antennas 21 arranged on the column 91 (a3), one or more antennas 21 arranged on the row 92 (b5) and one or more antennas 21 arranged on the row 92 (b7).

Secondly, the reading operation of gaming chip 71 in the area B-1 will be described. In this case, each gaming chip 71 is substantially placed in two adjacent intersection regions 121 so that the center of each gaming chip 71 is located away from the center of each intersection region 121, and each gaming chip 71 is detected in the adjacent intersection regions 121. Since the same unique number (identification number) of gaming chip 71 is detected in two adjacent intersection regions 121, the CPU 101 determines that the gaming chip 71 is placed on the adjacent regions 121 and an intermediate position of the adjacent regions 121 (boundary portion of the adjacent regions 121) corresponds to the center of the gaming chip 71. According to the example illustrated in FIGS. 12 and 13, one or more gaming chips 71 placed on an intersection region 121 (a5, b2) where the column 91 (a5) intersects with the row 92 (b2) and an intersection region 121 (a6, b2) where the column 91 (a6) intersects with the row 92 (b2) are read by one or more antennas 21 arranged on the column 91 (a5), one or more antennas 21 arranged on the column 91 (a6) and one or more antennas 21 arranged on the row 92 (b2). The CPU 101 determines that the center of each gaming chip 71 corresponds to an intermediate position of the adjacent intersection regions 121 (a5, b2) and (a6, b2) (that is a half width position of the row 92 with a horizontal width of columns a5 to a6). It is noted that the betting information detecting device 11 previously sets each antenna 21 so that the antenna 21 generates a magnetic field having a magnitude which is sufficient to read all gaming chips 71 stacked in layer in a state where a half area of each gaming chip 71 overlaps the antenna 21.

Figures 14, 15:
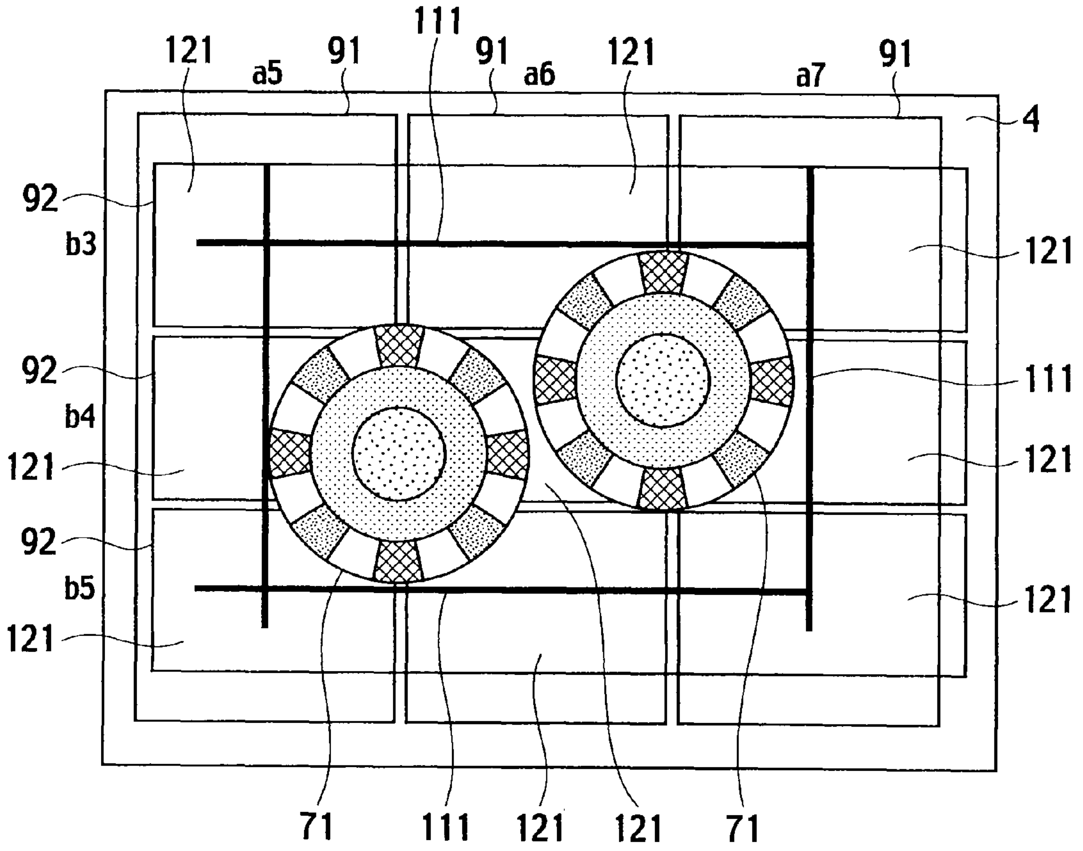
FIG. 14 is an explanatory diagram illustrating the processing carried out by the betting apparatus for game according to the exemplary embodiment of the present invention.
FIG. 15 is an explanatory diagram illustrating the processing carried out by the betting apparatus for game according to the exemplary embodiment of the present invention.

Finally, the reading operation of gaming chip 71 in the area B-2 will be described. In this case, each gaming chip 71 is substantially placed in two or more adjacent intersection regions 121 so that the center of each gaming chip 71 is located away from the center of each intersection region 121, and each gaming chip 71 is detected in the adjacent intersection regions 121. FIG. 14 is an enlarged view of the area B-2. As shown in FIG. 14, in the area B-2, each gaming chip 71 is disproportionately placed on two or more adjacent intersection regions 121 due to the arrangement of four lines 111. Therefore, an antenna 21 can not read all gaming chips stacked in layer in an intersection region 121 where only a small area of each gaming chip 71 overlaps the antenna 21.

FIG. 15 illustrates the reading result of the area B-2. In FIG. 15, column symbols "a5", "a6"and "a7" indicate the numbers a5, a6 and a7 assigned to the columns 91 and row symbols "b3", "b4" and "b5" indicate the numbers b3, b4 and b5 assigned to the rows 92. For example, an area where the column symbol "a5" and the row symbol "b4" crosses each other indicates an intersection region 121 (a5, b4). Numeric values 1001, 1002, 1003, 2001, 2002, 2003 and 2004 indicate unique numbers (identification numbers, chip numbers) of gaming chips 71.

Figures 16, 17:
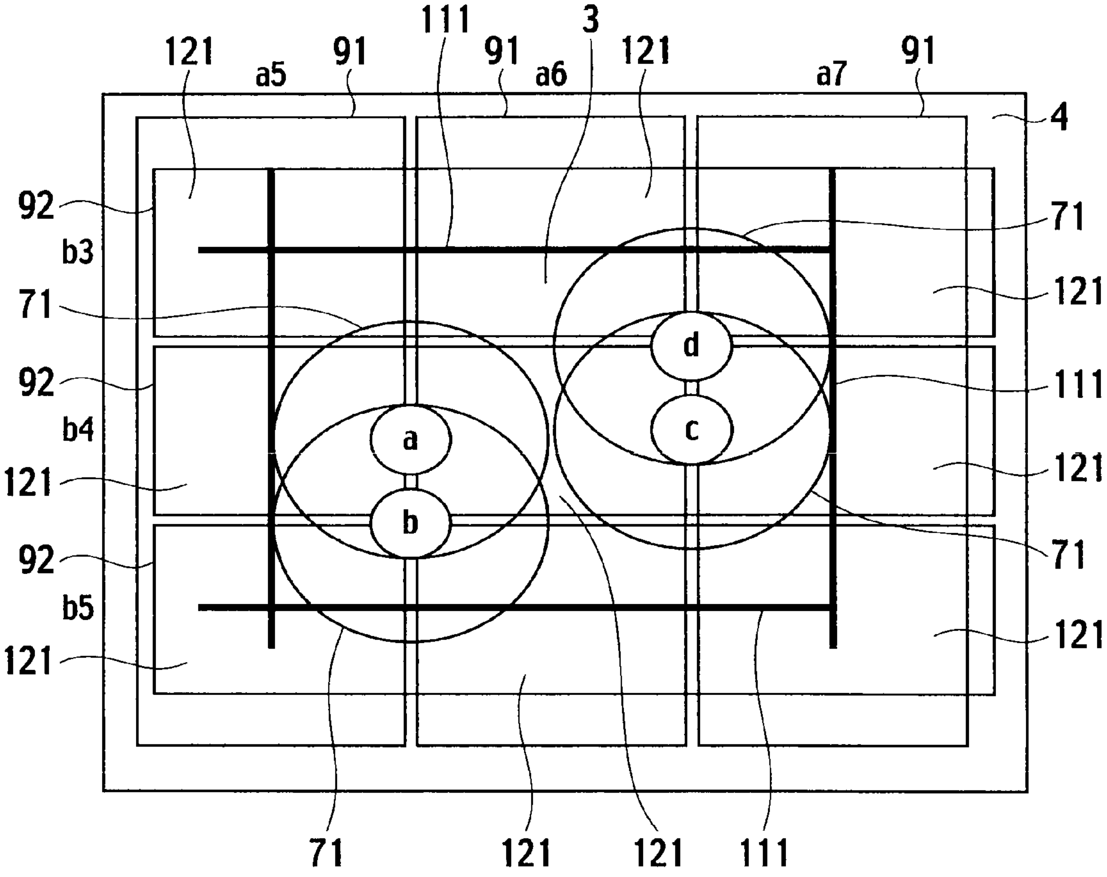
FIG. 16 is an explanatory diagram illustrating the processing carried out by the betting apparatus for game according to the exemplary embodiment of the present invention.
FIG. 17 is an explanatory diagram illustrating the processing carried out by the betting apparatus for game according to the exemplary embodiment of the present invention.

The CPU 101 calculates a tentative central coordinate (column, row) of each gaming chip 71. More specifically, the CPU 101 determines that the tentative central coordinate (column, row) of each gaming chip 71 read in a plurality of intersection regions 121 is a pair of a column intermediate position of an intersection region 121 or between the centers of adjacent intersection regions 121 and a row intermediate position of an intersection region 121 or between the centers of adjacent intersection regions 121. Thus, the CPU 101 obtains the result (database) shown in FIG. 16 based on the reading result of the area B-2 shown in FIG. 15. FIG. 16 shows a tentative central coordinate and a chip position with respect to a chip number of each gaming chip. For example, a tentative central coordinate (a5&a6, b4) indicates that a gaming chip 71 is detected in intersection regions 121 (a5, b4) and (a6, b4) and is a pair of a column intermediate position between the columns 91 (a5) and (a6) and a row intermediate position of the row 92 (b4), and a chip position "a" corresponding to the tentative central coordinate (a5&a6, b4) is shown in FIG. 17.

As shown in FIGS. 16 and 17, a tentative central coordinate (a5&a6, b4&b5) indicates that a gaming chip 71 is detected in intersection regions 121 (a5, b4), (a5, b5), (a6, b4) and (a6, b5) and is a pair of a column intermediate position between the columns 91 (a5) and (a6) and a row intermediate position between the rows 92 (b4) and (b5), and a chip position "b" corresponding to the tentative central coordinate (a5&a6, b4&b5) is shown in FIG. 17. A tentative central coordinate (a6&a7, b4) indicates that a gaming chip 71 is detected in intersection regions 121 (a6, b4) and (a7, b4) and is a pair of a column intermediate position between the columns 91 (a6) and (a7) and a row intermediate position of the row 92 (b4), and a chip position "c" corresponding to the tentative central coordinate (a6&a7, b4) is shown in FIG. 17. A tentative central coordinate (a6&a7, b3&b4) indicates that a gaming chip 71 is detected in intersection regions 121 (a6, b3), (a6, b4), (a7, b3) and (a7, b4) and is a pair of a column intermediate position between the columns 91 (a6) and (a7) and a row intermediate position between the rows 92 (b3) and (b4), and a chip position "d" corresponding to the tentative central coordinate (a6&a7, b3&b4) is shown in FIG. 17.

Since the distance between the tentative central coordinates (a5&a6, b4) (chip position "a") and (a5&a6, b4&b5) (chip position "b") is a half of a vertical width of row 92 (less than a diameter of gaming chip 71), the CPU 101 determines that it is impossible that two gaming chips 71 (chip numbers 1001, 1002) are stacked in layer at the chip position "a" and a gaming chip 71 (chip number 1003) is placed on the chip position "b" at the same time, wherein each gaming chip 71 has a diameter which is about 1.5 times the vertical width of the row 92. Therefore, the CPU 101 determines that the gaming chips 71 (chip numbers 1001, 1002) detected in the chip position "a" and the gaming chip 71 (chip number 1003) detected in the chip position "b" are stacked in layer at the same position. In this case, the CPU 101 determines that the gaming chips 71 (chip numbers 1001, 1002) detected in the chip position "a" and the gaming chip 71 (chip number 1003) detected in the chip position "b" belong to the same group, and registers the chip positions "a" and "b" in a column of same group in the database shown in FIG. 16.

On the other hand, since the distance between the tentative central coordinates (a5&a6, b4) (chip position "a") and (a6&a7, b4) (chip position "c") or between the tentative central coordinates (a5&a6, b4) (chip position "a") and (a6&a7, b3&b4) (chip position "d") is more than the diameter of gaming chip 71, the CPU 101 determines that it is possible that two gaming chips 71 (chip numbers 1001, 1002) are stacked in layer at the chip position "a" and two gaming chips 71 (chip number 2001, 2002) are placed on the chip position "c" at the same time or two gaming chips 71 (chip numbers 1001, 1002) are stacked in layer at the chip position "a" and two gaming chips 71 (chip numbers 2003, 2004) are placed on the chip position "d" at the same time. Therefore, the CPU 101 determines that the gaming chips 71 (chip numbers 1001, 1002) detected in the chip position "a" and the gaming chips 71 (chip numbers 2001, 2002) detected in the chip position "c" or the gaming chips 71 (chip numbers 2003, 2004) detected in the chip position "d" are stacked in layer at the same position. As well, the CPU 101 determines that the gaming chips 71 (chip numbers 2001, 2002) detected in the chip position "c" and the gaming chips 71 (chip numbers 2003, 2004) detected in the chip position "d" belong to the same group, and registers the chip positions "c" and "d" in the column of same group in the database shown in FIG. 16.

Thus, the CPU 101 compares the distance between tentative central coordinates with the diameter (fixed value) of gaming chip 71 and determines whether or not the distance between the tentative central coordinates is shorter than the diameter. After creating the database shown in FIG. 16, the CPU 101 calculates an average value of tentative central coordinates of gaming chips 71 belonging to the same group to set it as the center position of gaming chip 71. Thereby, the CPU 101 sets an intermediate position between the chip positions "a" and "b" as the center positions of gaming chips 71 detected in the chip positions "a" and "b" and determines that the gaming chips 71 are stacked in layer at the intermediate position between the chip positions "a" and "b", and an intermediate position between the chip positions "c" and "d" as the center positions of gaming chips 71 detected in the chip positions "c" and "d" and determines that the gaming chips 71 are stacked in layer at the intermediate position between the chip positions "c" and "d". As the result, the CPU 101 determines that the gaming chips 71 having the chip numbers 1001 to 1003 and 2001 to 2004 are placed on two portions in the same betting region 3.

Figure 18A:
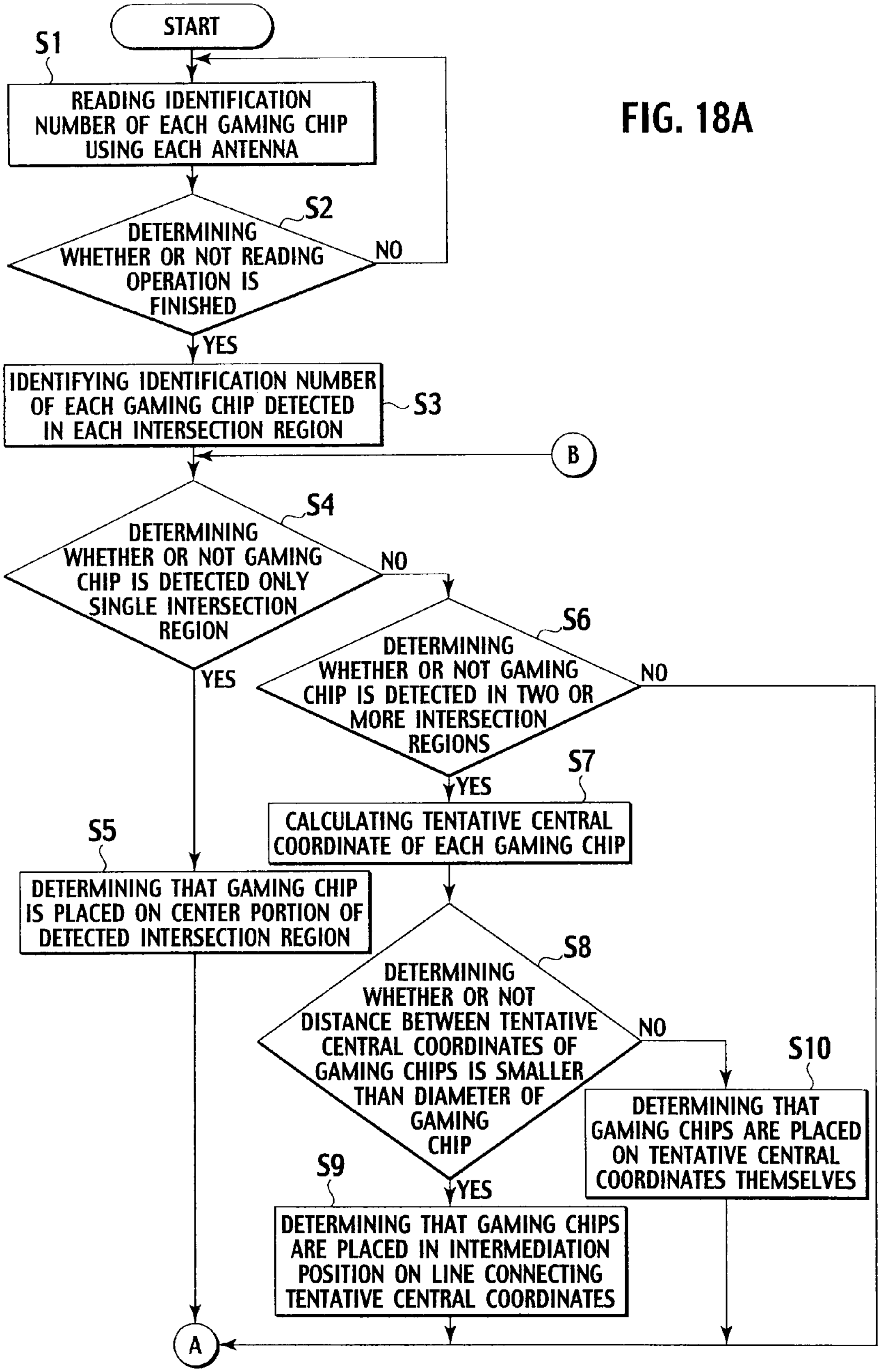
FIGS. 18A and 18B are flowcharts illustrating the processing carried out by the betting apparatus for game according to the exemplary embodiment of the present invention.
Figure 18B:
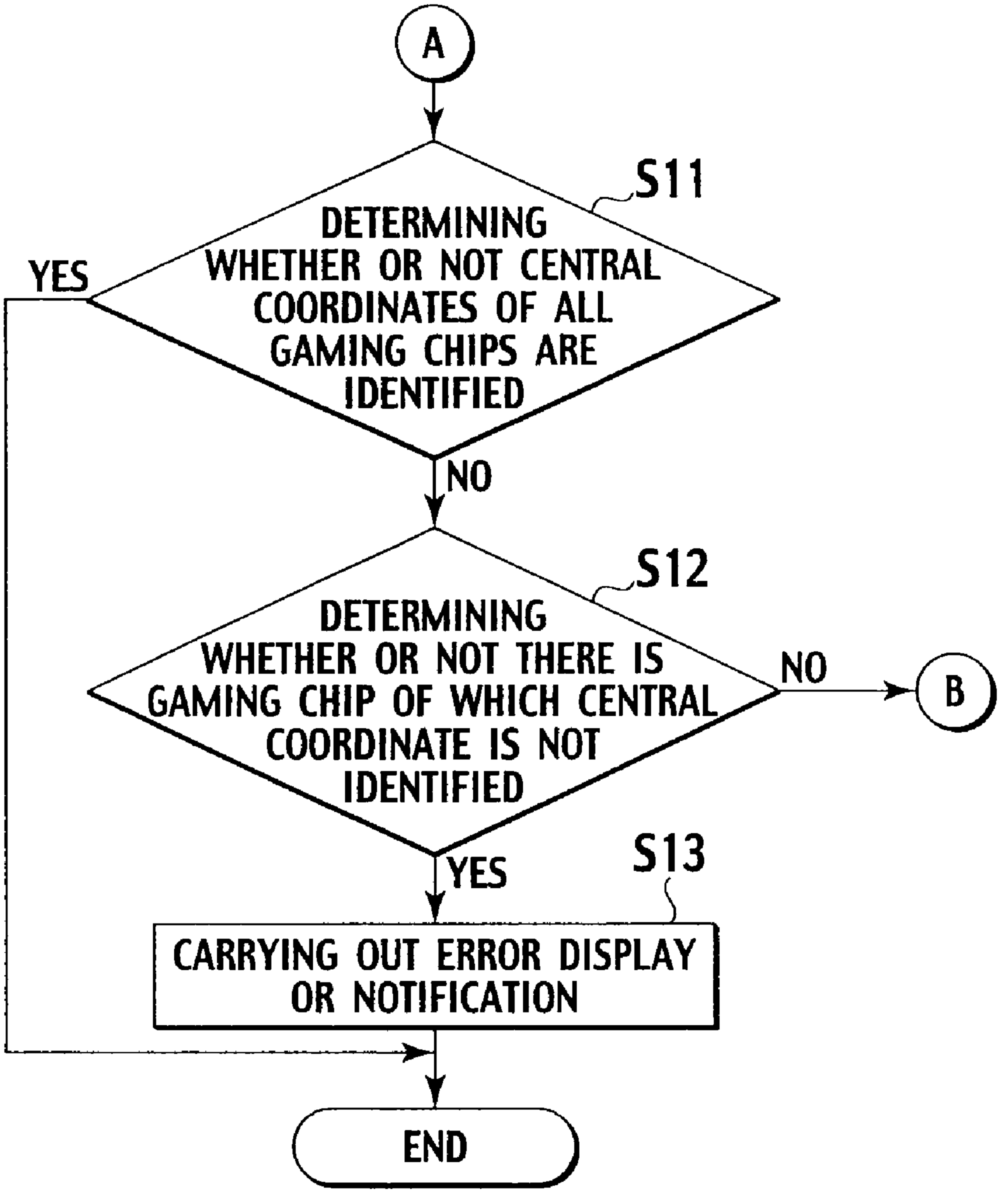

FIGS. 18A and 18B illustrate flowcharts at the time when the CPU 101 carries out the processing illustrated with reference to FIGS. 12 to 17.

In step S1, the CPU 101 carries out the reading operation using each antenna 21 of each column 91 and each antenna 21 of each row 92 in series to identify a unique number (identification number) of each gaming chip 71. In step S2, the CPU 101 determines whether or not the reading operation is finished. If the reading operation is finished, the process proceeds to step S3. If the reading operation is not finished, the process returns to step S1. In step S3, the CPU 101 carries out AND operation between the reading result of each column 91 and that of each row 92 to identify a unique number (identification number) of each gaming chip 71 detected in each intersection region 121.

In step S4, the CPU 101 determines whether or not a gaming chip 71 is detected in only a single intersection region

121. If the gaming chip 71 is detected in only the single intersection region 121, the process proceeds to step S5. If the gaming chip 71 is not detected in only the single intersection region 121, the process proceeds to step S6. In step S5, the CPU 101 determines that the gaming chip 71 is placed on the center portion of the intersection region 121. In step S6, the CPU 101 determines whether or not a gaming chip 71 is detected in two or more intersection regions 121. If the gaming chip 71 is detected in two or more intersection regions 121, the process proceeds to step S7. If the gaming chip 71 is not detected in two or more intersection regions 121, the process proceeds to step S11. In step S7, the CPU 101 calculates a tentative central coordinate of each gaming chip 71. For example, in a case where a gaming chip 71 is detected in two adjacent intersection regions 121, the CPU 101 sets an intermediation position on a line connecting the center portions of the adjacent intersection regions 121 as the tentative central coordinate. In a case where a gaming chip 71 is detected in four adjacent intersection regions 121, the CPU 101 sets an intersection position of diagonal lines connecting the center portions of the adjacent intersection regions 121 as the tentative central coordinate.

In step S8, the CPU 101 determines whether or not the distance between the tentative central coordinates of gaming chips 71 is smaller than the diameter of gaming chip 71. If the distance is smaller than the diameter of gaming chip 71, the process proceeds to step S9. If the distance is not smaller than the diameter of gaming chip 71, the process proceeds to step S10. In step S9, the CPU 101 determines that the gaming chips 71 are placed in an intermediation position on a line connecting the tentative central coordinates. In step S10, the CPU determines that the gaming chips 71 are placed on the tentative central coordinates themselves.

In step 51, the CPU 101 determines whether or not central coordinates of all gaming chips 71 are identified. If the central coordinates are identified, the process is ended. If the central coordinates are not identified, the process proceeds to step S12. In step S12, the CPU 101 determines whether or not there is a gaming chip 71 of which a central coordinate is not identified. If there is the gaming chip 71, the process proceeds to step S13. If there is not the gaming chip 71, the process returns to step S4. In step S13, the CPU 101 carries out an error display or a notification using an image display or a sound.

Thus, if a gaming chip 71 is read in a plurality of adjacent intersection regions 121, the betting apparatus 1 identifies an intermediate position of the plurality of adjacent intersection regions 121 as a tentative central coordinate of the gaming chip 71. Then, after all gaming chips 71 is read, the betting apparatus 1 determines whether or not a gaming chip 71 is placed on the same position as another gaming chip 71 based on the distance between tentative central coordinates of the gaming chip 71 and the another gaming chip 71. If the distance is smaller than the diameter of gaming chip 71, the betting apparatus 1 determines that the gaming chip 71 is placed on the same position as the another gaming chip 71. If the distance is larger than the diameter of gaming chip 71, the betting apparatus 1 determines that the gaming chip 71 is placed on the different position from the another gaming chip 71. Therefore, the betting apparatus 1 can surely determine where a gaming chip 71 is placed on the betting board 4 without being affected by the magnitude of magnetic field generated by each antenna 21.

Next, a modification of the present embodiment will be described below with reference to FIGS. 19 and 20.

Figure 19:
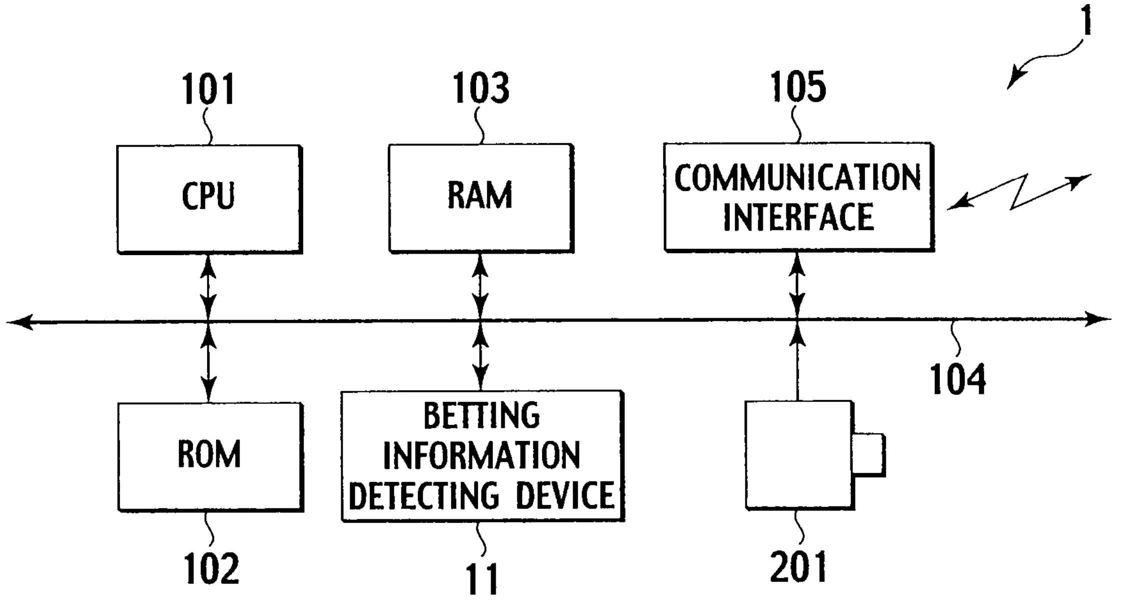
FIG. 19 is a block diagram of electrical connections in a betting apparatus for game according to a modified exemplary embodiment of the present invention.

As shown in FIG. 19, one or more imaging devices 201 for taking one or more images of one or more gaming chips 71 placed on the betting board 4 may be connected to the bus 104. Under this configuration, the CPU 101 carries out processing of FIG. 20 in addition to the processing of FIGS. 18A and 18B.

Figure 20:
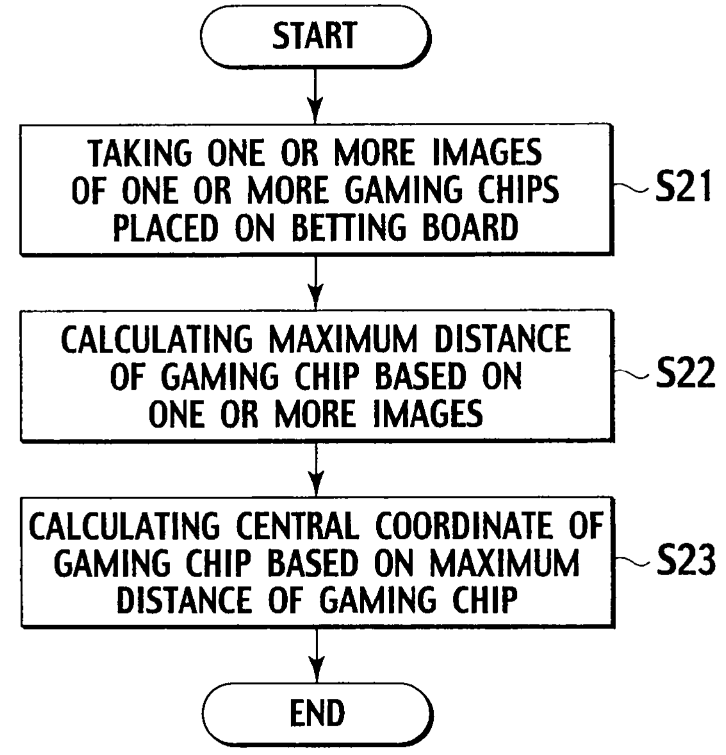
FIG. 20 is a flowchart illustrating processing carried out by the betting apparatus for game according to the modified exemplary embodiment of the present invention.

As shown in FIG. 20, in step S21, the CPU 101 controls the one or more imaging devices 201 to take one or more images of one or more gaming chips 71 placed on the betting board 4. In step S22, the CPU 22 calculates a maximum distance of gaming chip 71 (the distance from one end to the other end of gaming chip 71) based on one or more images. For example, in a case where a gaming chip 71 has a circular shape, the maximum distance is a diameter of gaming chip 71. In a case where a gaming chip 71 has a rectangular shape, the maximum distance is a length of the long side of gaming chip 71. In step S23, the CPU 101 calculates a central coordinate of gaming chip 71 based on the maximum distance of gaming chip 71 in series.

A means for calculating a maximum distance of gaming chip 71 based on image data taken by an infrared camera has been known (e.g., the means is disclosed in Japanese Published Unexamined Application No. H 07-167618 or Japanese Published Unexamined Application No. H08-86851). Further, a stereo matching method using a stereo camera, an EM algorism, or a means for calculating a maximum distance of gaming chip 71 using triangulation based on image data taken by a SVM (e.g., the means is disclosed in Japanese Published Unexamined Application No. 2004-28811 or http://www.is.kochi-u.ac.jp/~honda/studentarc/03koike-pre.pdf) has been known as the means for calculating a maximum distance of gaming chip 71.

Thus, if a central coordinate of gaming chip 71 is calculated, the CPU 101 can determine which intersection region 121 a gaming chip 71 is placed on because a coordinate of each intersection region 121 is previously identified.

The CPU 101 carries out processing of FIG. 20 in parallel chip 71 of which the CPU 101 can not identify a central coordinate in the processing of FIG. 18B (step S12 YES), the CPU 101 applies a central coordinate calculated in the processing of FIG. 20 to the gaming chip 71. Thereby, even if a central coordinate of gaming chip 71 is not identified in the processing of FIGS. 18A and 18B, the betting apparatus 1 can identify a central coordinate of gaming chip 71 using the processing of FIG. 20.

In the above exemplary embodiment, although the betting apparatus 1 is used in roulette, the medium position determination apparatus of the present invention is not limited to it and the betting apparatus 1 may be applied to various games. For example, as the various games, Sic bo in which three dices are to be placed on a gaming table, a card game in which cards are to be placed on a gaming table, a chess in which pieces are to be placed on a gaming table, and Go or Gobang in which go pieces are to be placed on a gaming table are cited. The betting apparatus can surely determine where each dice, each card, each piece, or each go piece is placed on the gaming table.

What is claimed is:

1. A medium position determination apparatus comprising:

a gaming table on which a gaming medium is placed;

a reading unit that electromagnetically reads information stored in a gaming medium placed on each region formed on the gaming table;

an identification information identifying unit that identifies identification information of a gaming medium placed on each region formed on the gaming table based on information of the gaming medium read by the reading unit;

a tentative position identifying unit that, when the same gaming medium is identified by the identification information identifying unit in two or more regions formed on the gaming table, identifies an intermediate position of the two or more regions as a tentative position of the gaming medium;

a same region determining unit that determines whether or not gaming media are placed on the same region based on a distance between tentative positions of the gaming media and dimensions of the gaming media; and a medium position determining unit that, determines that, when a gaming medium is identified by the identification information identifying unit in one region formed on the gaming table, the gaming medium is placed on a center position of the one region, determines that, when the same region determining unit determines that gaming media are not placed on the same region, the gaming media are placed on tentative positions of the gaming media, and determines that, when the same region determining unit determines that gaming media are placed on the same region, the gaming media are placed on an intermediation position of tentative positions of the gaming media.

2. The medium position determination apparatus according to claim 1, further comprising:

an imaging unit that takes an image of a gaming medium placed on the gaming table; and an imaged medium calculating unit that calculates a distance from a first end to a second end of a gaming medium taken by the imaging unit as an image, and calculates a central coordinate of the gaming medium based on the calculated distance, wherein the medium position determining unit determines that a gaming medium of which a placed position is not determined is placed on a central coordinate of the gaming medium calculated by the imaged medium calculating unit.

* * * * *